US011138297B2

(12) United States Patent
Vargas et al.

(10) Patent No.: US 11,138,297 B2
(45) Date of Patent: Oct. 5, 2021

(54) SOUND COMPOSITION AS AUTHENTICATION

(71) Applicant: International Business Machines Corporation, Armonk, NY (US)

(72) Inventors: Juan F. Vargas, Cary, NC (US); Mark Maresh, Wake Forest, NC (US); Michael J. Whitney, Cary, NC (US); Colm Nolan, Navan (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 390 days.

(21) Appl. No.: 16/050,086

(22) Filed: Jul. 31, 2018

(65) Prior Publication Data
US 2020/0042678 A1  Feb. 6, 2020

(51) Int. Cl.
| | |
|---|---|
| G06F 7/04 | (2006.01) |
| G06F 12/00 | (2006.01) |
| G06F 12/14 | (2006.01) |
| G06F 13/00 | (2006.01) |
| G11C 7/00 | (2006.01) |
| G06F 21/31 | (2013.01) |

(52) U.S. Cl.
CPC .................... G06F 21/31 (2013.01)

(58) Field of Classification Search
CPC ........................................................ G06F 21/31
USPC ............................................................ 726/19
See application file for complete search history.

(56) References Cited

U.S. PATENT DOCUMENTS

| | | | |
|---|---|---|---|
| 7,792,782 B2 | 9/2010 | Yun | |
| 8,099,770 B2 | 1/2012 | Makkinejad | |
| 9,286,901 B1 | 3/2016 | Jimenez | |
| 9,495,525 B2 | 11/2016 | Grigg | |
| 9,633,638 B2 | 4/2017 | Lim | |
| 9,876,787 B2 | 1/2018 | Lang | |
| 2007/0261536 A1* | 11/2007 | Shen | G10H 1/0016 84/609 |
| 2010/0326256 A1 | 12/2010 | Emmerson | |
| 2012/0137855 A1* | 6/2012 | Gannon | G10H 1/383 84/613 |

(Continued)

OTHER PUBLICATIONS

Kumar, Naveen, "User Authentication Using Musical Password", International Journal of Computer Applications, vol. 59, No. 9, Dec. 2012.

(Continued)

*Primary Examiner* — Jeffrey C Pwu
*Assistant Examiner* — Samuel Ambaye
(74) *Attorney, Agent, or Firm* — Cantor Colburn LLP; Tihon Poltavets

(57) ABSTRACT

A computer-implemented method includes receiving an indication of a first selected instrument, where the first selected instrument is selected from a plurality of instruments. One or more first sequences of notes are received. One or more saved sound compositions are generated based on the first selected instrument and the one or more first sequences of notes. One or more current sound compositions are compared to the one or more saved sound compositions using sound analysis. A user is authenticated based on a similarity between the one or more current sound compositions and the one or more saved sound composition.

17 Claims, 5 Drawing Sheets

(56) References Cited

U.S. PATENT DOCUMENTS

| | | |
|---|---|---|
| 2013/0233154 A1* | 9/2013 | Little .................. G10H 1/0008 |
| | | 84/609 |
| 2014/0230630 A1 | 8/2014 | Wieder |
| 2014/0254831 A1* | 9/2014 | Patton ..................... H03G 3/20 |
| | | 381/107 |
| 2017/0180288 A1 | 6/2017 | Barbour |
| 2018/0018446 A1 | 1/2018 | Hill |
| 2018/0018447 A1 | 1/2018 | Hill |
| 2018/0032716 A1 | 2/2018 | McClintock |

OTHER PUBLICATIONS

Rao et al.; "Multifactor Graphical Password Authentication System Using Sound Signature and Handheld Device", International Journal of Engineering Trends and Technology (IJETT)—vol. 9, No. 10, Mar. 2014.

Sayed et al.; "Graphical Password Based Authentication System with Sound Sequence", International Journal of Computer Applications, vol. 138, No. 12, Mar. 2016.

Wobbrock, Jacob O., "TapSongs: Tapping Rhythm-Based Passwords on a Single Binary Sensor", User Interface Software and Technology (UIST),<http://citeseerx.ist.psu.edu/viewdoc/download?doi=10.1.1.180.4743&rep=rep1&type=pdf>. Oct. 2009. Retrieved Apr. 15, 2018.

* cited by examiner

SOUND COMPOSITION AS AUTHENTICATION

BACKGROUND

The present invention relates to authentication and, more specifically, to sound composition as authentication.

Authentication is used in a wide range of circumstances to verify the identity of a user. Authentication is especially useful before a web service allows a user access to a user profile with which the user claims to be associated. Such web services are used on websites of banks, employers, service providers, retailers, and social media, for example. In some cases, these web services maintain critical data about the user that the user would not like shared with others. Thus, authentication is used to prove that a user is who he or she claims to be, so as to avoid allowing access to a bad actor who wishes to access that critical data.

Various authentication methods are used, primarily including passwords. For instance, each time a user wishes access to an associated user profile on a web server, the user must enter a password correctly. Recent authentication methods have introduced elements other than passwords to increase security. These other elements include, for example, additional encodings, tokens, confirmations by second applications, two-factor authentications, and biometrics.

SUMMARY

Embodiments of the present invention are directed to a computer-implemented method for authenticating a user. A non-limiting example of the computer-implemented method includes receiving an indication of a first selected instrument, where the first selected instrument is selected from a plurality of instruments. One or more first sequences of notes are received. One or more saved sound compositions are generated based on the first selected instrument and the one or more first sequences of notes. One or more current sound compositions are compared to the one or more saved sound compositions using sound analysis. A user is authenticated based on a similarity between the one or more current sound compositions and the one or more saved sound composition.

Embodiments of the present invention are directed to a system for authenticating a user. A non-limiting example of the system includes a memory having computer-readable instructions and one or more processors for executing the computer-readable instructions. The computer-readable instructions include receiving an indication of a first selected instrument, where the first selected instrument is selected from a plurality of instruments. Further according to the computer-readable instructions, one or more first sequences of notes are received. One or more saved sound compositions are generated based on the first selected instrument and the one or more first sequences of notes. One or more current sound compositions are compared to the one or more saved sound compositions using sound analysis. A user is authenticated based on a similarity between the one or more current sound compositions and the one or more saved sound composition.

Embodiments of the invention are directed to a computer-program product for authenticating a user, the computer-program product including a computer-readable storage medium having program instructions embodied therewith. The program instructions are executable by a processor to cause the processor to perform a method. A non-limiting example of the method includes receiving an indication of a first selected instrument, where the first selected instrument is selected from a plurality of instruments. Further according to the method, one or more first sequences of notes are received. One or more saved sound compositions are generated based on the first selected instrument and the one or more first sequences of notes. One or more current sound compositions are compared to the one or more saved sound compositions using sound analysis. A user is authenticated based on a similarity between the one or more current sound compositions and the one or more saved sound composition.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
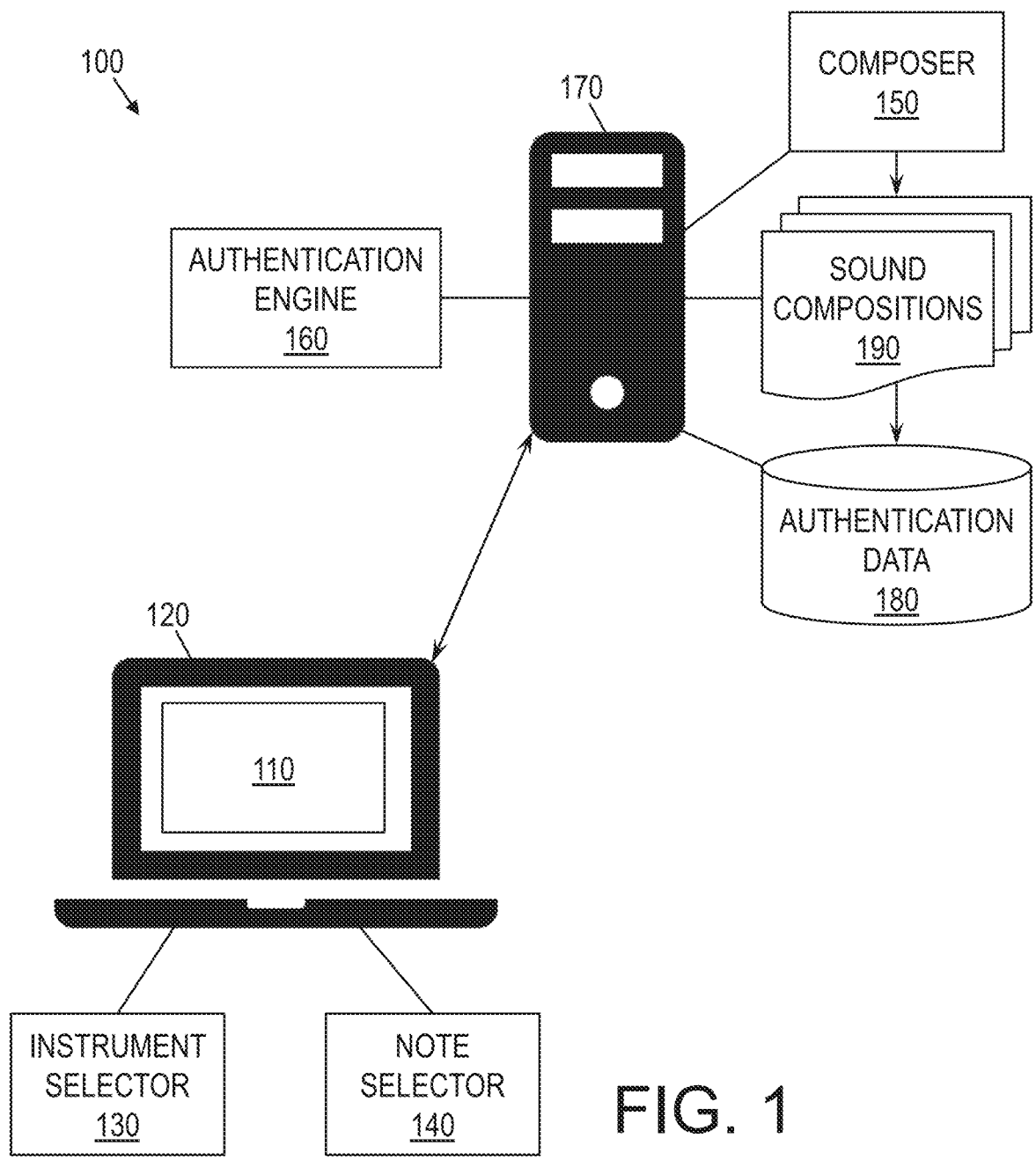
FIG. 1 is a diagram of an authentication system according to some embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, although various methods of authentication exist, each method comes with its own problems and works best for a subset of the population. For instance, passwords are easily forgotten unless they are frequently reused, in which case the reuse renders them less secure than they would be otherwise. Biometric authentication does not inherently require the user to memorize data, but biometric readers are not necessarily as consistent as desired, and false negatives are still common with biometric readers integrated into some consumer devices. Further, with conventional authentication methods, authentication data (e.g., user names and passwords) that is needed to authenticate users is available on an authentication server that confirms users' identities during authentication. Thus, if a bad actor obtains access to the authentication data on the authentication server, the bad actor then has the information required to authenticate himself as a legitimate user. Thus, while new methods of authentication are useful alternatives to passwords, the introduction of additional and improved methods is welcome.

Turning now to an overview of the aspects of the invention, one or more embodiments of the invention address the above-described shortcomings of the prior art by providing an authentication mechanism that is based on sound composition. Specifically, according to some embodiments of the invention, a user enters one or more sound tracks (i.e., a series of notes) associated with one or more selected instruments, and the user enters a sequence, or order, for the sound tracks. The sound tracks and instrument selections may be transmitted to a server for authentication. The server may convert the sound tracks and instruments into a sound composition, which may be compared with a saved sound composition to authenticate the user. Thus, a user may be authenticated by selecting the same instruments, entering the same sound tracks, and entering the same sequence for the sound tracks as when the user set up the authentication.

The above-described aspects of the invention address the shortcomings of the prior art by providing a new mechanism for authenticating a user, thus providing an option that may be preferable to certain users as compared to other authentication methods. According to some embodiments of the invention, this authentication mechanism may provide improved security over some conventional methods, especially when the authentication server does not store the selection of instruments. In that case, if a bad actor is able to obtain access to authentication data on the authentication server, the authentication data may include the sound composition and not the instruments used to generate the sound composition. The bad actor must therefore still determine which instruments were selected in order to recreate the sound composition for authentication purposes.

Turning now to a more detailed description of aspects of the present invention, FIG. 1 is a diagram of an authentication system 100 according to some embodiments of the invention. As shown in FIG. 1, the authentication system 100 may include a user interface 110 presentable to a user of a computing device 120, where the computing device 120 may be, for example, a desktop computer, a notebook computer, a tablet, or a smartphone. For example, the user interface 110 may be displayed through a web browser of the computing device 120. The user interface 110 may include an instrument selector 130 and a note selector 140. Together, the instrument selector 130 and the note selector 140 may enable a user to submit to the authentication system 100 one or more instruments and one or more sound tracks per instrument. As used in this disclosure, the term "sound track" refers to a set of notes in sequence. The notes may be represented in various ways that need not include actual sound. For example, a sound track may be represented as an ordered list of elements or an array of elements, such as letters, numbers, or encodings, where each such element represents a note and maps to a unique, corresponding note.

The authentication system 100 may also include a composer 150 and an authentication engine 160, each of which may reside on an authentication server 170 located remotely from the computing device 120. Each of the composer 150 and the authentication engine 160 may include hardware, software, or a combination of both. For instance, each may be a software module or a specialized hardware circuit. Further, although these and other components are illustrated in FIG. 1 as being distinct, one of skill in the art will understand that the distinction is for illustrative purposes only, and combinations of the composer 150, the authentication engine 160, or other components may be integrated together based on design preferences.

The authentication engine 160 may have access to authentication data 180, which may be stored as one or more files, tables, databases, or portions thereof. For each user known to the authentication server 170, the authentication data 180 may include a sound composition 190 along with an associated identifier of the user. For example, and not by way of limitation, the identifier may be a user name or other unique identifier. Thus, for a plurality of users known to the authentication server 170, the authentication data 180 may maintain a plurality of sound compositions 190 in the authentication data 180.

As discussed in detail below, to authenticate himself through the authentication system 100, a user may select one or more instruments. The authentication system 100 may enable this selection through the instrument selector 130, which may present a set of instruments to the user through the user interface 110 and may receive the selection of one or more instruments. The authentication system may build one or more sound tracks for each instrument. Building sound tracks may be enabled by the note selector 140, which may present the user with a representation of a selected instrument through the user interface 110 and may receive from the user a sequence of selected notes. The instruments and sound tracks may be transmitted to the authentication server 170. In some embodiments of the invention, the sound tracks are transmitted in a sequence the user has selected, such that the sound tracks are organized in an order the user has determined. At the authentication server 170, the composer 150 may generate a sound composition 190, which may be stored in the authentication data 180 along with the user's identifier, thereby associating the sound composition 190 with the user.

The user may later attempt to authenticate himself by again selecting one or more instruments and building one or more sound tracks per instrument. These instruments and sound tracks may be transmitted to the authentication server 170, where the composer 150 may generate a new sound composition 190. To authenticate the user, the authentication engine 160 may compare the new sound composition 190 to the saved sound composition 190 associated with the user in the authentication data 180. In some embodiments of the invention, the authentication engine 160 additionally compares the order of sound tracks submitted to the order of sound tracks associated with the user in the authentication data 180. After authentication, the authentication server 170 may allow the user to access critical data, such as data associated with the user and stored on the authentication server 170 or elsewhere. In the latter case, the authentication server may notify a third-party server that the user is authenticated, and the third-party server may thus grant access to the user. Further, in some embodiments of the invention, an authentication server 170 need not be used, in which case the functions attributed to the authentication server 170 herein may be performed locally at the computing device 120.

Figure 2:
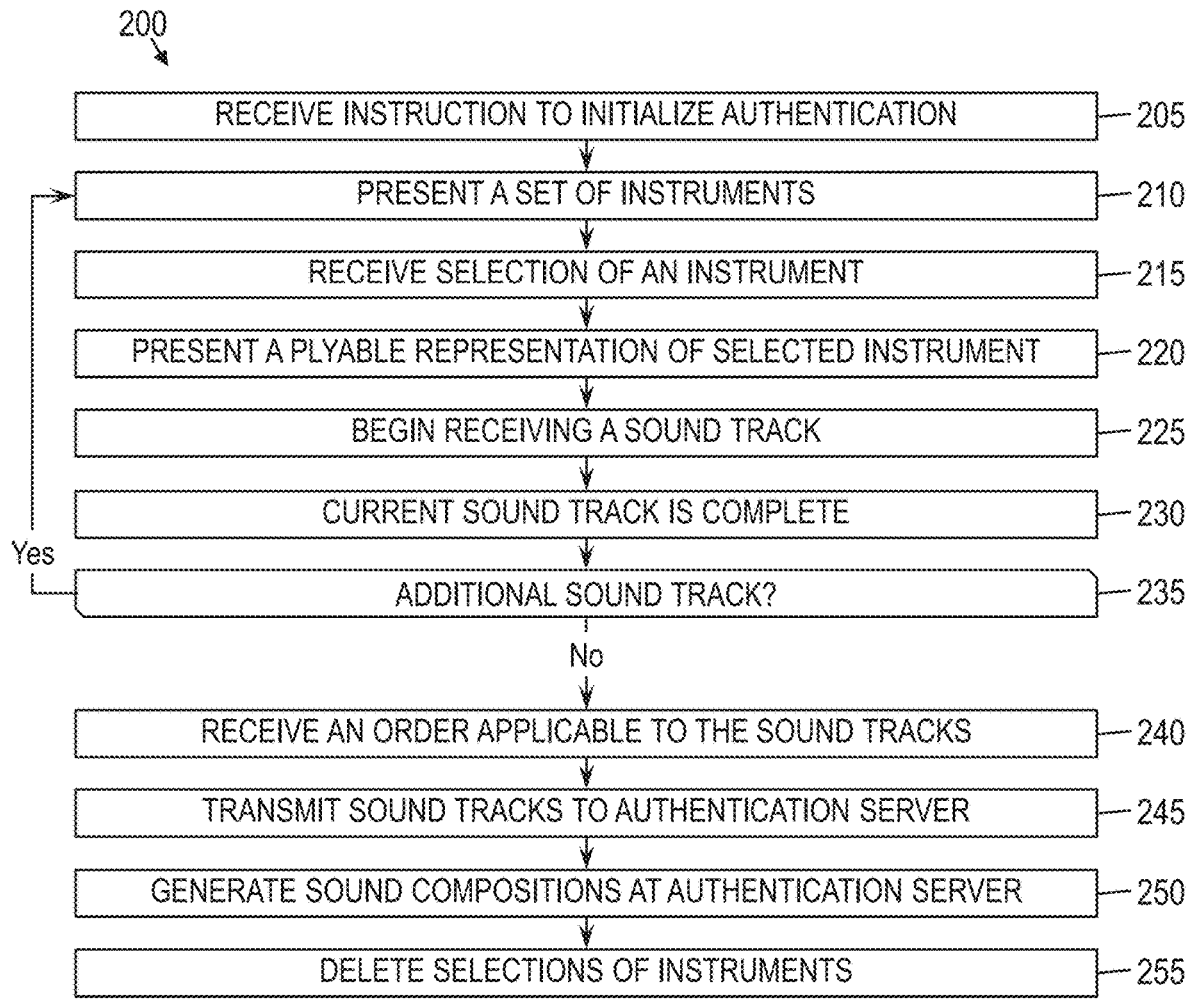
FIG. 2 is a flow diagram of a method of initializing user authentication, according to some embodiments of the invention.

FIG. 2 is a flow diagram of a method 200 of initializing user authentication, according to some embodiments of the invention. At block 205, an instruction is received that authentication should be initialized. For example, and not by way of limitation, when a user sets up an account with the authentication server 170 or with a third party utilizing the authentication system 100, authentication of the user may be initialized to prove the user's identity in the future.

Blocks 210-230 below may be performed as a loop, which may be iterated to enable the user to enter multiple sound tracks.

At block 210, the authentication system 100 may present the user with a set of instruments. For instance, the authentication server 170 may communicate with the computing device 120, such as through a web browser of the computing device 120, to present the user interface 110, which may show the set of instruments in a selectable manner. In some embodiments of the invention, each instrument in the set of instruments may be an instrument existing in the real world or may be a fictional instrument. In either case, in some embodiments of the invention, each instrument may have a unique sound as compared to the other instruments, or at least, not all of the instruments in the set of instruments may have the same sound.

Figure 3A:
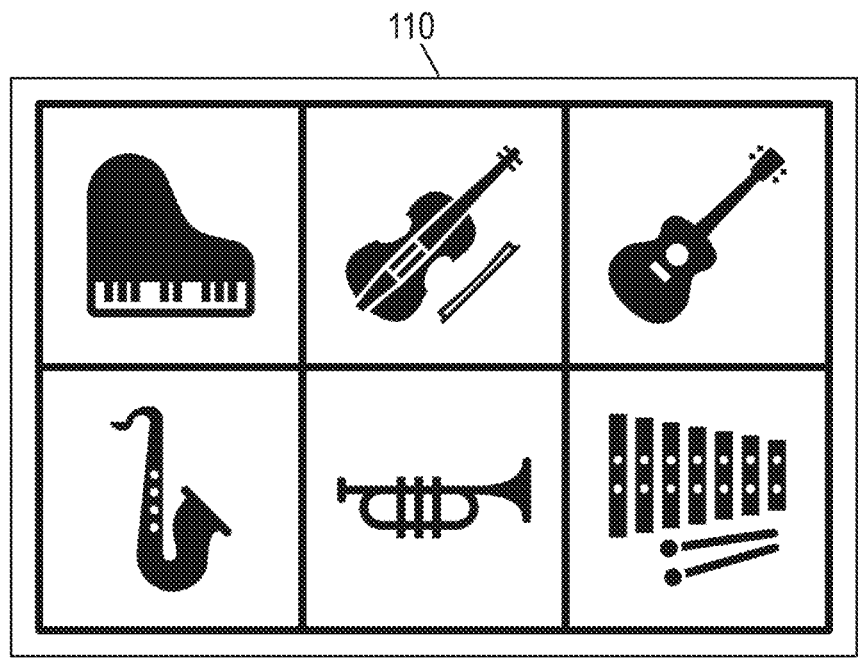
FIG. 3A is an example portion of a user interface of the authentication system, showing a set of instruments that are selectable, according to some embodiments of the invention.

FIG. 3A is an example portion of the user interface 110 of the authentication system 100, according to some embodiments of the invention. As shown, in this example, the set of instruments is displayed through the user interface 110 and includes a piano, a violin, a guitar, a saxophone, a trumpet, and a xylophone. Each instrument may be selectable by the user.

At block 215 of FIG. 2, a selection of an instrument may be received. Specifically, for instance, through the user interface 110, the user may select an instrument in the set of instruments presented. At block 220, responsive to the selection, the authentication system 100 may present the user with a playable representation of the selected instrument.

Figure 3B:
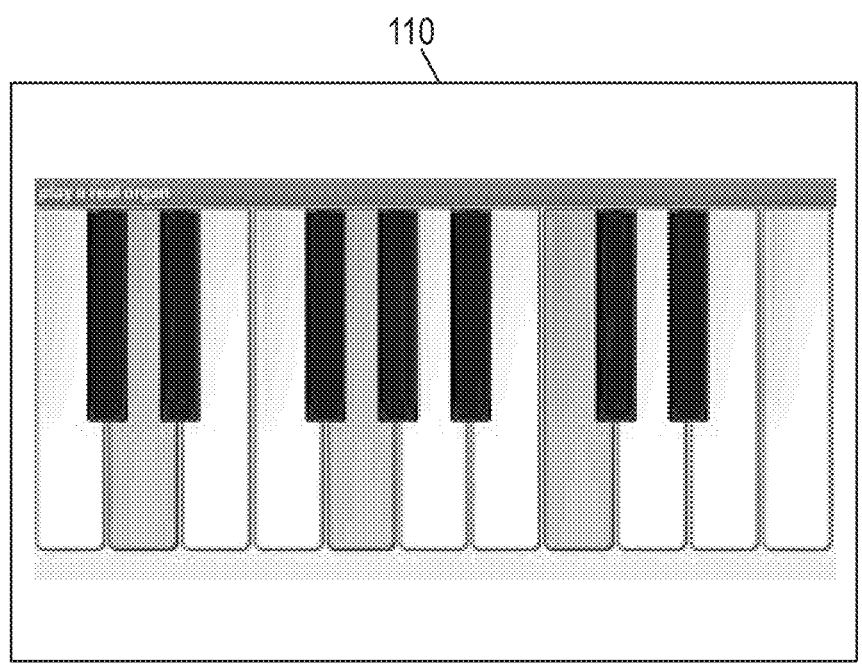
FIG. 3B is another example portion of the user interface of the authentication system, showing a playable representation of a selected instrument, according to some embodiments of the invention.

FIG. 3B is another example portion of the user interface 110 of the authentication system 100, according to some embodiments of the invention. In this example, the user has selected the piano, and now the authentication system 100 is presenting the user with a playable representation of a piano.

At block 225 of FIG. 2, the user may enter a sound track using the representation of the selected instrument, where the sound track is a sequence of notes. For instance, in the piano shown in FIG. 3B, the user may select various keys of the piano in sequence, and the sequence may be saved as a sound track. In some embodiments of the invention, the authentication system 100 may audibly play the sequence of notes selected, either while the user selects the notes or after the user has finished entering the full sequence. For example, upon receiving a selection of each note, the computing device 120 may issue a sound corresponding to the note (e.g., a simulation of what the note sounds like on the selected instrument). For another example, the authentication system 100 may play the sounds corresponding to the sequence of notes in the full sound track upon direction from the user. To this end, the computing device 120 or the authentication server 170 may maintain, for each available instrument, a plurality of sound files (e.g., MP3 files) including a sound file corresponding to each available note for each instrument in the set of instruments. Thus, to play a note or a sequence of notes, the computing device 120 may play the sound file or sequence of sound files corresponding to those notes on the selected instrument. While the user is entering notes through the user interface 110, one or more of these sound files may be streamed to the computing device 120, so that the user can hear them as needed to illustrate the sound track entered or being entered.

If other sound tracks have already been entered and saved by the user in prior iterations of the loop, the user may request that one or more of those other sound tracks be played together with the current sound track. Each such other sound track may be available and associated with an instrument. The authentication system 100 may thus simultaneously or sequentially play the current sound track in combination with one or more sound tracks already saved by the user.

Further, in some embodiments of the invention, the authentication system 100 may record the tempo at which the sequence of notes is entered. In this case, upon playing back an entire sound track, the authentication system 100 may play back the sound track according to the recorded tempo. In some embodiments of the invention, use of tempo may be optional based on the user's preference. In that case, the user may indicate to the authentication system 100 whether tempo is to be a consideration in authenticating the user.

At block 230 of FIG. 2, the current sound track may be completed and saved. For instance, when the user is happy with the sound track, the user may indicate that the sound track is complete, and the sound track may be saved. An indication of the selected instrument may also be saved and associated with the current sound track. Specifically, the sound track and instrument may be saved on the computing device 120. However, additionally or alternatively, the sound track and instrument may be transmitted to the authentication server 170 and saved there. In some embodiments of the invention, when transmitting a sound track and associated instrument, no actual sound file is transmitted. Rather, a sound track may be a representation of a sequence of notes and need not include sound corresponding to those notes.

At decision block 235, the user may be asked whether an additional sound track is requested. If the user indicates that no further sound track is requested, then the method 200 may proceed to block 240. However, if an additional sound track is requested by the user, then the method 200 may return to block 210 to enable the user to select an instrument for the next sound track. In some embodiments of the invention, there is no requirement that each sound track be associated with a distinct instrument, and thus the set of instruments displayed to the user for selection may be consistent regardless of how many times the user creates new sound tracks.

At block 240, in some embodiments of the invention, when the user is done creating sound tracks, the authentication system 100 may receive from the user an order, or sequence, of the sound tracks. In some cases, there may be a default ordering of sound tracks, and that default order may be the order in which the sound tracks were entered by the user. However, if the user selects a new order, this new order may replace the order in which the tracks were entered as the used order of the sound tracks. Further, within proving the new order, the user may indicate that two or more sound tracks are to be combined concurrently, such that they occur together in parallel within a sound composition 190.

At block 245, if not yet transmitted, the various sound tracks, instruments, and ordering entered by the user may be transmitted from the computing device 120 to the authentication server 170. In the transmission, each sound track may be associated with the applicable instrument. Further, if the tempo is being used for authentication, the applicable tempo of each sound track may be transmitted to the authentication server 170 as well. Thus, the authentication server 170 may receive this data and may then have local access to the sound tracks and associated instruments. In some embodiments of the invention, no sound files are transmitted to represent the sound tracks, instruments, sound track order, or tempos. Rather, as discussed above, each sound track may exclude sound but may instead include data (e.g., a series of numbers, a series of letters) representing a sequence of notes.

At block 250, the authentication system 100 may generate one or more sound compositions 190. Each sound composition 190 may be stored as a sound file, for example. The one or more sound compositions 190 may be based on one or more of the following: the sound tracks; for each sound track, the associated instrument; if applicable, the tempo of each sound track; and the order of the sound tracks. As mentioned above, the authentication system 100 may have access to sound files representing each available note of each available instrument. Thus, for each sound track, which represents a sequence of notes, the authentications system 100 may generate a sound composition 190 or a portion of a sound composition 190 by combining the sound files associated with the applicable instrument, in a combination that complies with the sequence of notes in the sound track. If tempo is being considered, then the sound composition 190 may be generated according to the applicable tempo, which may mean adding silent portions or stretching the lengths of the sound files making up the sound composition 190 as needed to imitate the applicable tempo.

It will be understood by one skilled in the art that each sound track may result in a corresponding sound composition 190, where each such sound composition 190 amounts to a portion of a set of sound compositions 190 resulting from all the sound tracks. Alternatively, the sounds corresponding to the sound tracks may be combined in sequence to create a single sound composition 190 from multiple sound tracks, in which each sound track may be represented as a portion of the single sound composition 190. In either case, in some embodiments of the invention, the order indicated by the user may be respected in the sound composition 190 itself. In that case, a sound composition 190 resulting from two or more sound tracks in the sequence may comply with the order indicated by the user, and such that distinct sound compositions 190 may be separate but ordered according to the user's indicated order. Further, if indicated by the user, the sounds corresponding to two or more sound tracks may be combined concurrently (i.e., in parallel) to create a sound composition 190. The resulting one or more sound compositions 190 may be saved in the authentication data 180 in association with the user. Alternatively, however, the sound composition need not comply with the user's order, and the user's indicated order may be compared to the order specified in the authentication data 190.

At block 255, unnecessary data that was used generate the sound compositions 190 may be deleted from the authentication server 170. Specifically, the authentication system 100 may authenticate users based on sound compositions 190. Thus, the selection of instruments need not be saved in the authentication data 180 and, for enhanced security, may be deleted from the authentication server 170. As will be described below, in some embodiments of the invention, the sound tracks are used during authentication and may thus be saved in the authentication data 180 in association with the user.

At this point, authentication of the user has been initialized. In the future, when the user desires to authenticate himself, he can select instruments and create sound tracks that will lead to one or more sound compositions 190 matching the one or more sound compositions 190 associated with the user in the authentication data 180, as described below.

Figure 4:
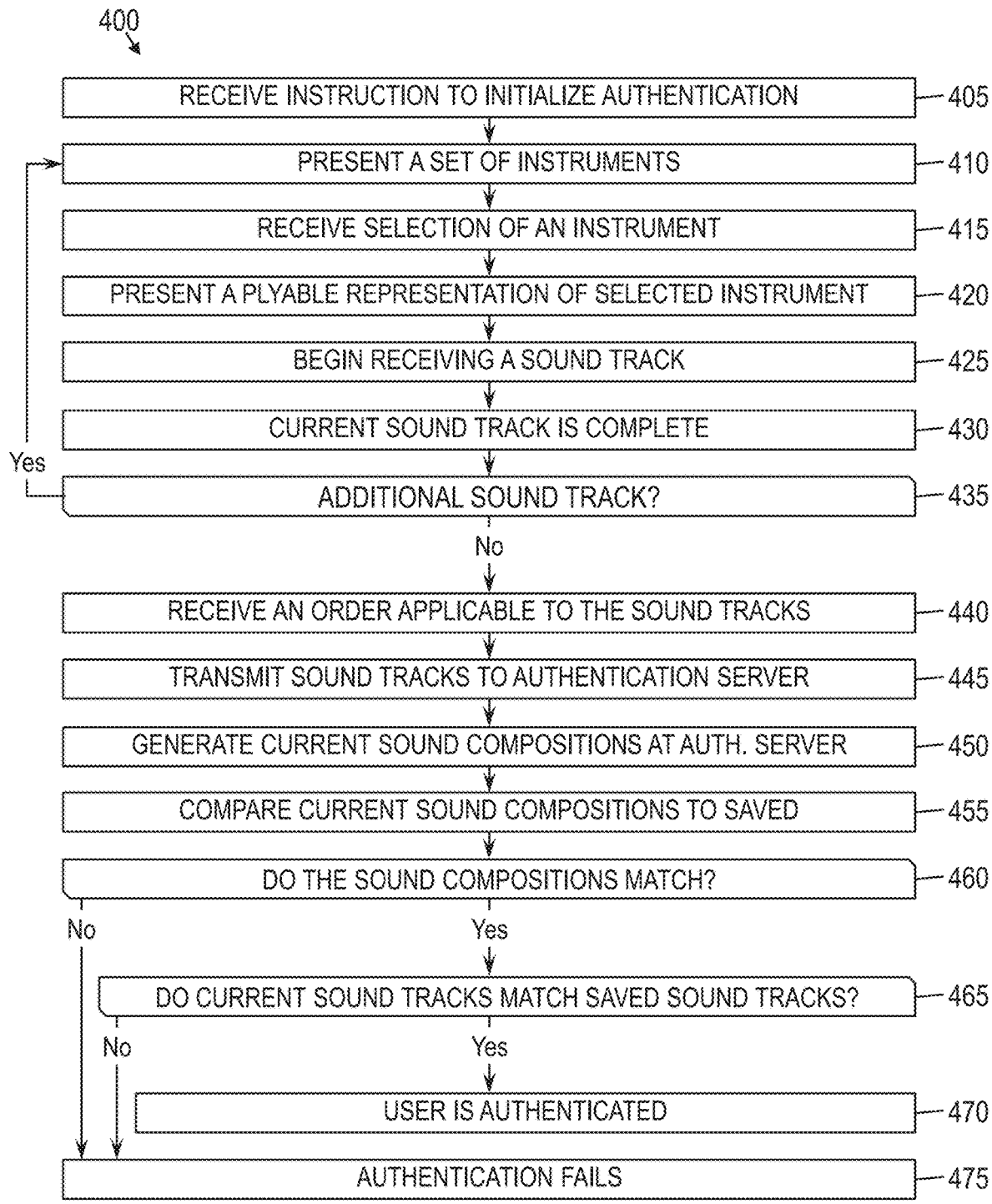
FIG. 4 is a flow diagram of a method of authenticating a user for whom authentication has been initialized, according to some embodiments of the invention.

FIG. 4 is a flow diagram of a method 400 of authenticating a user for whom authentication has been initialized, according to some embodiments of the invention. In other words, the method 200 of FIG. 2 may have already occurred for the user in question. At block 405 of FIG. 4, an indication may be received that the user would like to authenticate himself. This indication may include an identifier of the user. For example, and not by way of limitation, when a user already has an account with the authentication server 170 or with a third party utilizing the authentication system 100, the user may authenticate himself to access that account.

It will be understood that, although various details are omitted below, blocks 410 through 450 may mirror blocks 210 through 250 of FIG. 2 and may be implemented in the same manner or a similar manner. At block 410 of FIG. 4, the authentication system 100 may present the user with the set of instruments. The set of instruments presented to the user during authentication may be the same set of instruments that were presented to the user during initialization, thus enabling the user to select the same instruments selected during initialization. At block 415, a selection of an instrument may be received. At block 420, responsive to the selection, the authentication system 100 may present the user with a playable representation of the selected instrument.

At block 425, the user may enter a sound track using the representation of the selected instrument, where the sound track is a sequence of notes. Unlike at block 225 of FIG. 2, at block 425, even if the tempo is supported by the authentication system 100, the user need not be asked whether tempo is to be recorded. Rather, because the user's identity has been provided in the form of the identifier, the authentication server 170 may already be aware of whether tempo is incorporated into authentication of the user. If tempo is being used, then the authentication system 100 may once again record the tempo at which the sequence of notes in the sound track is entered by the user. If tempo is not being used, then the authentication system 100 may ignore the tempo at which the sequence of notes is entered at block 425.

At block 430, the sound track may be completed and saved. At decision block 435, the user may be asked whether an additional sound track is requested. If the user indicates that no further sound track is requested, then the method 400 may proceed to block 440. However, if an additional sound track is requested by the user, then the method may return to block 410 to enable the user to select an instrument.

At block 440, in some embodiments of the invention, when the user is done creating sound tracks, the authentication system 100 may receive from the user a new order, or sequence, of the sound tracks. If no new order of sound tracks is received from the user, the order in which the sound tracks were entered may be used. At block 445, the various sound tracks entered by the user may be transmitted from the computing device 120 to the authentication server, with each sound track being transmitted along with an indication of the associated instrument and, if applicable, the associated tempo.

At block 450, the authentication system 100 may generate one or more sound compositions 190. The one or more sound compositions 190 may be based on one or more of the following: the sound tracks; for each sound track, the associated instrument; if applicable, the tempo of each sound track; and the order of the sound tracks. As discussed above with respect to block 250 of FIG. 2, the manner of generating the one or more sound compositions 190 may be based on the user's indication of order, including any indication of combining sound tracks concurrently in a sound composition 190.

The one or more sound compositions 190 generated at this point are referred to below as the current sound compositions 190, while the one or more sound compositions 190 already associated with the user in the authentication data 180 are referred to below as the saved sound compositions 190. Analogously, the one or more sound tracks entered by the user in blocks 410-435 are referred to below as the current sound tracks, while the one or more sound tracks already associated with the user in the authentication data 180 are referred to below as the saved sound tracks.

At block 455, the one or more current sound compositions 190 may be compared to the one or more saved sound compositions 190. For instance, this comparison may involve sound analysis. Various mechanisms are known in the art for comparing compositions of sound, such as musical pieces, and one or more of these known mechanisms may be used according to some embodiments of this invention.

At decision block 460, it may be determined whether the one or more current sound compositions 190 match the one or more saved sound compositions 190. In some embodiments of the invention, a threshold (e.g., 95%, 5%) may be established for either the similarity level or dissimilarity level between sound compositions 190 for them to be deemed matching. In that case, matching may be found if a current sound composition 190 and a saved sound composition 190 meet (e.g., equal or exceed) the threshold where the threshold is a measure of similarity, or if a current sound composition 190 and a saved sound composition 190 do not meet the threshold where the threshold is a measure of dissimilarity. If multiple current sound compositions 190 were generated, then for a match to be determined, it may be required that the number of current sound compositions 190 matches the quantity of saved sound compositions. Further, each current sound composition 190 may be compared to the saved sound composition at the same order position within the order of sound compositions 190 indicated by the user.

As mentioned above, in some cases, tempo may be incorporated into authentication. If applicable, for matching to be found, the tempo of a current sound composition 190 may be deemed to be the same as a saved sound composition 190 or may be deemed to be the same at least to a threshold similarity (e.g., 80%).

If the one or more current sound compositions 190 are deemed not to match the one or more saved sound compositions 190, then the method 400 may skip to block 475. However, if the one or more current sound compositions 190 are deemed to match the one or more saved sound compositions 190, then the method 400 may proceed to decision block 460.

As discussed above, in some embodiments of the invention, saved sound tracks are stored in the authentication data 180. In that case, at decision block 465, it may be determined whether the one or more current sound tracks match the one or more saved sound tracks. As discussed above, the current sound tracks may be ordered according to the user's indication of order. Thus, for matching to be found, it may be required that the current sound tracks are the same as the saved tracks, as well as ordered in the same way. If the current sound tracks are deemed not to match the saved sound tracks, then the method 400 may skip to block 475. However, if the current sound tracks are deemed to match the saved sound tracks, then the method 400 may proceed to block 470.

It will be understood that block 465 need not be performed after blocks 455-460. In other words, the current sound tracks and saved sound tracks may be compared before, after, or in parallel with generation of the current sound compositions 190 and comparison of the current sound compositions 190 to the saved sound compositions 190. The order of these blocks shown in FIG. 4 is provided for illustrative purposes only.

At block 470, the current sound compositions 190 have been deemed to match the saved sound compositions 190 and, if applicable, the current sound tracks have been deemed to match the saved sound tracks. Thus, at this block, the user may be authenticated. As such, the user may be granted access to critical data for which the authentication was required.

However, at block 475, either the current sound compositions 190 have been deemed not to match the saved sound compositions 190 or, if applicable, the current sound tracks have been deemed not to match the saved sound tracks. As a result, authentication may fail, and the user may be notified of that failure. The user may be denied access to critical data for which authentication is required.

Figure 5:
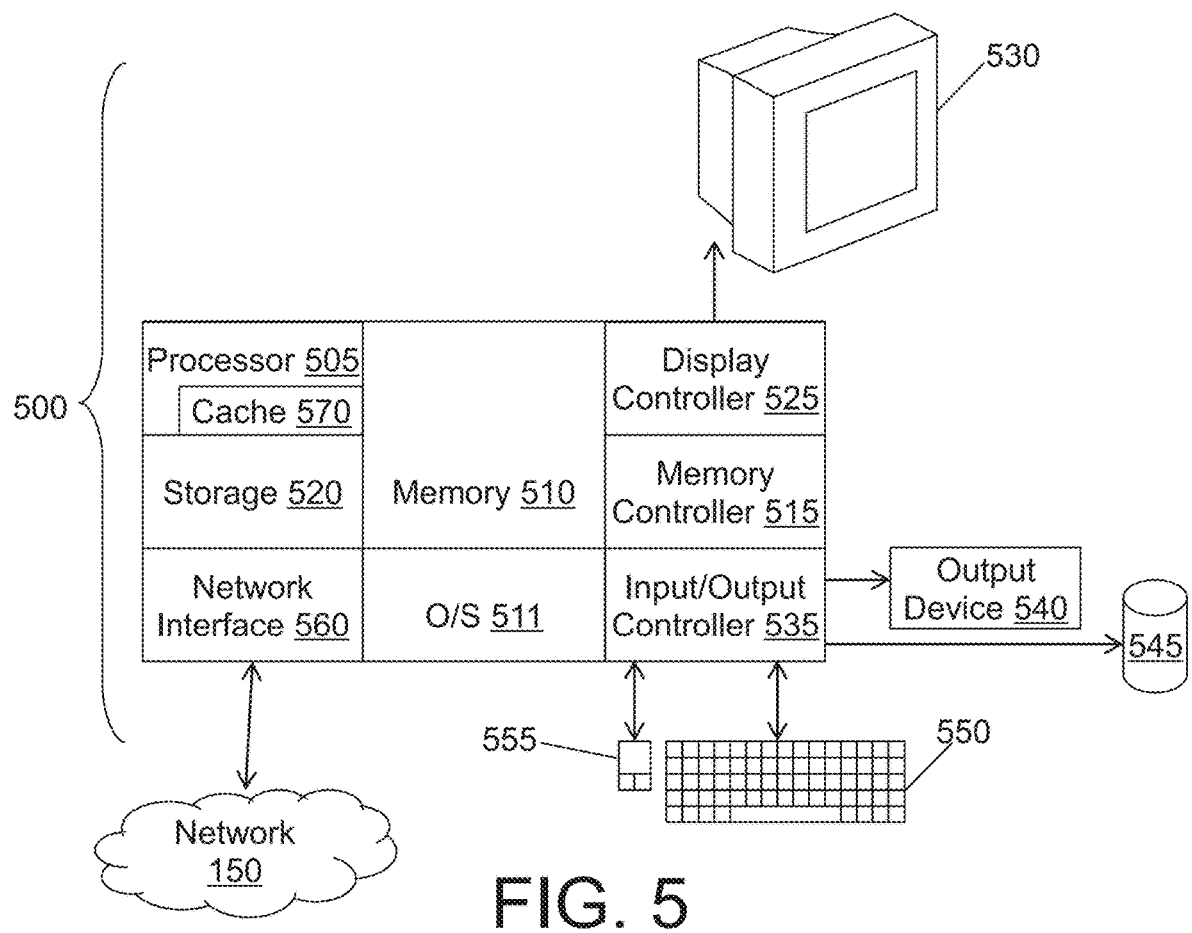
FIG. 5 is a block diagram of a computer system for implementing some or all aspects of the authentication system, according to some embodiments of this invention.

FIG. 5 is a block diagram of a computer system 500 for implementing some or all aspects of the system, according to some embodiments of this invention. The authentication systems 100 and methods described herein may be implemented in hardware, software (e.g., firmware), or a combination thereof. In some embodiments, the methods described may be implemented, at least in part, in hardware and may be part of the microprocessor of a special or general-purpose computer system 500, such as a personal computer, workstation, minicomputer, or mainframe computer. For example, and not by way of limitation, each of the computing device 120 and the authentication server 170 may be a computer system 500 as shown in FIG. 5.

In some embodiments, the computer system 500 includes a processor 505, memory 510 coupled to a memory controller 515, and one or more input devices 545 and/or output devices 540, such as peripherals, that are communicatively coupled via a local I/O controller 535. These devices 540 and 545 may include, for example, a printer, a scanner, a microphone, and the like. Input devices such as a conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 540, 545 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be a custom made or commercially available processor, a central processing unit (CPU), an auxiliary processor among several processors associated with the computer system 500, a semiconductor based microprocessor (in the form of a microchip or chip set), a macroprocessor, or other device for executing instructions. The processor 505 includes a cache 570, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 570 may be organized as a hierarchy of more cache levels (L1, L2, etc.).

The memory 510 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, or other types of storage media. Note that the memory 510 may have a distributed architecture, where various components are situated remote from one another but may be accessed by the processor 505.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially may control the execution of other computer programs and provides scheduling, input-output control, file and data management, memory management, and communication control and related services.

Additional data, including, for example, instructions for the processor 505 or other retrievable information, may be stored in storage 520, which may be a storage device such as a hard disk drive or solid-state drive. The stored instructions in memory 510 or in storage 520 may include those enabling the processor to execute one or more aspects of the authentication systems 100 and methods of this disclosure.

The computer system 500 may further include a display controller 525 coupled to a display 530. In some embodiments, the computer system 500 may further include a network interface 560 for coupling to a network 565. The network 565 may be an IP-based network for communication between the computer system 500 and an external server, client and the like via a broadband connection. The network 565 transmits and receives data between the computer system 500 and external systems. In some embodiments, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Authentication systems 100 and methods according to this disclosure may be embodied, in whole or in part, in computer program products or in computer systems 500, such as that illustrated in FIG. 5.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:
1. A computer-implemented method comprising:
displaying a plurality of instruments on a user interface;

receiving an indication of a first selected instrument, wherein the first selected instrument is selected from the plurality of instruments;

receiving one or more first sequences of notes;

generating one or more saved sound compositions based on the first selected instrument and the one or more first sequences of notes;

comparing, by an authentication engine, one or more current sound compositions to the one or more saved sound compositions using sound analysis;

associating the first sequence of notes with the first selected instrument;

associating a second sequence of notes with a second selected instrument, wherein the saved sound composition comprises a first simulation of the first sequence of notes played by the first selected instrument and a second simulation of the second sequence of notes played by the second selected instrument;

authenticating, by the authentication engine, a user based on a similarity between the one or more current sound compositions and the one or more saved sound composition exceeding a threshold value, wherein the authentication allows the user to access critical data; and denying the user access to the critical data, by the authentication engine, based on the similarity between the one or more current sound compositions and the one or more saved sound composition being below the threshold value.

2. The computer-implemented method of claim 1, further comprising generating the one or more current sound compositions, wherein the generating the one or more current sound compositions comprises:

receiving an indication of a current selected instrument, wherein the current selected instrument is selected from the plurality of instruments;

receiving one or more current sequences of notes; and generating the one or more current sound compositions based on the current selected instrument and the one or more current sequences of notes.

3. The computer-implemented method of claim 1, further comprising:

saving the one or more saved sound compositions in authentication data, wherein the authentication data is used to authenticate a plurality of users; and deleting the indication of the first selected instrument, wherein the comparing the one or more current sound compositions to the one or more saved sound compositions is absent consideration of the first selected instrument.

4. The computer-implemented method of claim 1, further comprising:

saving the one or more first sequences of notes in authentication data, wherein the authentication data is used to authenticate a plurality of users;

comparing the one or more current sequences of notes to the one or more first sequences of notes; and wherein the authenticating the user is further based on a similarity between the one or more current sequences of notes and the one or more first sequences of notes.

5. The computer-implemented method of claim 1, further comprising:

recording a first tempo of the one or more first sequences of notes;

wherein the generating the one or more saved sound compositions is further based on the first tempo, wherein at least a portion of the one or more saved sound compositions has the first tempo; and wherein the comparing the one or more current sound compositions to the one or more saved sound compositions using sound analysis comprises comparing a current tempo of the one or more current sound compositions to the first tempo of the one or more saved sound compositions.

6. The computer-implemented method of claim 1, further comprising:

receiving an instruction to reorder the one or more first sequences of notes according to a new order;

wherein the generating the one or more saved sound compositions is further based on the new order of the one or more first sequences of notes.

7. The computer-implemented method of claim 6, wherein the new order indicates that a first sequence of notes in the one or more first sequences of notes and a second sequence of the notes in the one or more first sequences of notes are simultaneous.

8. A system comprising:

a memory having computer-readable instructions; and one or more processors for executing the computer-readable instructions, the computer-readable instructions comprising:

displaying a plurality of instruments on a user interface;

receiving an indication of a first selected instrument, wherein the first selected instrument is selected from the plurality of instruments;

receiving one or more first sequences of notes;

generating one or more saved sound compositions based on the first selected instrument and the one or more first sequences of notes;

comparing, by an authentication engine, one or more current sound compositions to the one or more saved sound compositions using sound analysis;

associating the first sequence of notes with the first selected instrument;

associating a second sequence of notes with a second selected instrument, wherein the saved sound composition comprises a first simulation of the first sequence of notes played by the first selected instrument and a second simulation of the second sequence of notes played by the second selected instrument;

authenticating, by the authentication engine, a user based on a similarity between the one or more current sound compositions and the one or more saved sound composition exceeding a threshold value, wherein the authentication allows the user to access critical data; and denying the user access to the critical data, by the authentication engine, based on the similarity between the one or more current sound compositions and the one or more saved sound composition being below the threshold value.

9. The system of claim 8, the computer-readable instructions further comprising generating the one or more current sound compositions, wherein the generating the one or more current sound compositions comprises:

receiving an indication of a current selected instrument, wherein the current selected instrument is selected from the plurality of instruments;

receiving one or more current sequences of notes; and generating the one or more current sound compositions based on the current selected instrument and the one or more current sequences of notes.

10. The system of claim 8, the computer-readable instructions further comprising:
saving the one or more saved sound compositions in authentication data, wherein the authentication data is used to authenticate a plurality of users; and
deleting the indication of the first selected instrument, wherein the comparing the one or more current sound compositions to the one or more saved sound compositions is absent consideration of the first selected instrument.

11. The system of claim 8, the computer-readable instructions further comprising:
saving the one or more first sequences of notes in authentication data, wherein the authentication data is used to authenticate a plurality of users;
comparing the one or more current sequences of notes to the one or more first sequences of notes; and
wherein the authenticating the user is further based on a similarity between the one or more current sequences of notes and the one or more first sequences of notes.

12. The system of claim 8, the computer-readable instructions further comprising:
recording a first tempo of the one or more first sequences of notes;
wherein the generating the one or more saved sound compositions is further based on the first tempo, wherein at least a portion of the one or more saved sound compositions has the first tempo; and
wherein the comparing the one or more current sound compositions to the one or more saved sound compositions using sound analysis comprises comparing a current tempo of the one or more current sound compositions to the first tempo of the one or more saved sound compositions.

13. A computer-program product for authenticating a user, the computer-program product comprising a non-transitory computer-readable storage medium having program instructions embodied therewith, the program instructions executable by a processor to cause the processor to perform a method comprising:
displaying a plurality of instruments on a user interface;
receiving an indication of a first selected instrument, wherein the first selected instrument is selected from the plurality of instruments;
receiving one or more first sequences of notes;
generating one or more saved sound compositions based on the first selected instrument and the one or more first sequences of notes;
comparing, by an authentication engine, one or more current sound compositions to the one or more saved sound compositions using sound analysis;
associating the first sequence of notes with the first selected instrument;
associating a second sequence of notes with a second selected instrument, wherein the saved sound composition comprises a first simulation of the first sequence of notes played by the first selected instrument and a second simulation of the second sequence of notes played by the second selected instrument;
authenticating, by an authentication engine, a user based on a similarity between the one or more current sound compositions and the one or more saved sound composition exceeding a threshold value, wherein the authentication allows the user to access critical data; and
denying the user access to the critical data, by the authentication engine, based on the similarity between the one or more current sound compositions and the one or more saved sound composition being below the threshold value.

14. The computer-program product of claim 13, the method further comprising generating the one or more current sound compositions, wherein the generating the one or more current sound compositions comprises:
receiving an indication of a current selected instrument, wherein the current selected instrument is selected from the plurality of instruments;
receiving one or more current sequences of notes; and
generating the one or more current sound compositions based on the current selected instrument and the one or more current sequences of notes.

15. The computer-program product of claim 13, the method further comprising:
saving the one or more saved sound compositions in authentication data, wherein the authentication data is used to authenticate a plurality of users; and
deleting the indication of the first selected instrument, wherein the comparing the one or more current sound compositions to the one or more saved sound compositions is absent consideration of the first selected instrument.

16. The computer-program product of claim 13, the method further comprising:
saving the one or more first sequences of notes in authentication data, wherein the authentication data is used to authenticate a plurality of users;
comparing the one or more current sequences of notes to the one or more first sequences of notes; and
wherein the authenticating the user is further based on a similarity between the one or more current sequences of notes and the one or more first sequences of notes.

17. The computer-program product of claim 13, the method further comprising:
recording a first tempo of the one or more first sequences of notes;
wherein the generating the one or more saved sound compositions is further based on the first tempo, wherein at least a portion of the one or more saved sound compositions has the first tempo; and
wherein the comparing the one or more current sound compositions to the one or more saved sound compositions using sound analysis comprises comparing a current tempo of the one or more current sound compositions to the first tempo of the one or more saved sound compositions.

* * * * *